(12) United States Patent
Corbett et al.

(10) Patent No.: US 7,295,806 B2
(45) Date of Patent: Nov. 13, 2007

(54) USING DIRECTIONAL ANTENNAS TO ENHANCE WIRELESS MESH NETWORKS

(75) Inventors: Christopher J. Corbett, Issaquah, WA (US); Warren V. Barkley, Millcreek, WA (US); Amer Aref Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 10/449,545

(22) Filed: May 30, 2003

(65) Prior Publication Data

US 2004/0242275 A1  Dec. 2, 2004

(51) Int. Cl.
H04B 7/15   (2006.01)
(52) U.S. Cl. .................. 455/11.1; 455/9; 455/13.3; 455/16; 455/67.11; 455/67.13; 455/562.1; 370/274; 370/279; 370/351; 370/406; 709/238; 709/239; 709/242; 709/243
(58) Field of Classification Search .................. 455/9, 455/10, 11.1, 13.1, 562.1, 575.7, 82, 63.1, 455/63.4, 67.13, 67.11, 423, 436, 437, 438, 455/439, 440, 441, 442, 443, 444, 445, 16, 455/7, 414.1, 41.2, 13.3, 277.1, 277.2, 13; 343/703, 751; 342/74, 81; 370/274, 279, 370/293, 315, 316, 317, 492, 501, 351, 406; 709/238, 239, 242, 243
See application file for complete search history.

(56) References Cited

U.S. PATENT DOCUMENTS 5,504,935 A * 4/1996 Vercauteren ................ 455/438
5,509,028 A * 4/1996 Marque-Pucheu .......... 375/211

5,835,859 A 11/1998 Doner (Continued)

FOREIGN PATENT DOCUMENTS

WO   WO/0250947   6/2002

(Continued)

OTHER PUBLICATIONS

Mesh Networks; a new Architecture for Broadband Wireless Access Systems RAWCOM 2000: Mesh Networks; a new Architecture for Broadband Wireless Access Systems Philip Whitehead MA, Radiant Networks PLC, The Mansion, Chesterford Park, Little Chesterford, Essex CB10 1XL, UK 2000 IEEE pp. 43-46, no month used.

(Continued)

Primary Examiner—Rafael Perez-Gutierrez
Assistant Examiner—Olumide Ajibade-Akonai
(74) Attorney, Agent, or Firm—Workman Nydegger (57) ABSTRACT

The principles of the present invention provide for using directional antennas to adaptively communicate in a wireless mesh network. A number of infrastructure components are included in a wireless mesh network environment. Each infrastructure component includes an omni-directional antenna and one or more directional antennas (e.g., electronically steered phased array antennas) that can be used to communicate with other infrastructure component and wireless devices. Directional antennas can utilize one or more directional beams that can be directed towards an infrastructure component or wireless device to communicate with the infrastructure component or wireless device. Infrastructure components can adapt to communicate with the same destination through different intermediary infrastructure components. Since the signal strength of a directional beam can be greater than that of an omni-directional antenna of the same gain, infrastructure components can be separated by greater distances.

28 Claims, 3 Drawing Sheets

U.S. PATENT DOCUMENTS

| | | | |
|---|---|---|---|
| 5,850,593 A * | 12/1998 | Uratani | 455/11.1 |
| 5,883,884 A * | 3/1999 | Atkinson | 370/279 |
| 6,006,096 A | 12/1999 | Trompower | |
| 6,249,247 B1 * | 6/2001 | Inugai et al. | 342/359 |
| 6,463,301 B1 * | 10/2002 | Bevan et al. | 455/562.1 |
| 6,493,545 B1 | 12/2002 | Sugaya | |
| 6,584,080 B1 * | 6/2003 | Ganz et al. | 370/315 |
| 6,640,087 B2 | 10/2003 | Reed | |
| 6,647,244 B1 * | 11/2003 | Haymond et al. | 455/11.1 |
| 6,671,499 B1 * | 12/2003 | Ylitalo et al. | 455/101 |
| 6,735,452 B1 | 5/2004 | Foster | |
| 6,771,988 B2 * | 8/2004 | Matsuoka et al. | 455/562.1 |
| 6,816,706 B1 * | 11/2004 | Hohnstein et al. | 455/25 |
| 6,862,430 B1 * | 3/2005 | Duffy et al. | 455/11.1 |
| 7,003,261 B2 * | 2/2006 | Dietz et al. | 455/11.1 |
| 7,110,715 B2 * | 9/2006 | Gupta | 455/11.1 |
| 7,130,586 B2 | 10/2006 | Corbett | |
| 7,239,894 B2 | 7/2007 | Corbett | |
| 2001/0031624 A1 * | 10/2001 | Schmutz | 455/13.4 |
| 2002/0002065 A1 * | 1/2002 | Mesecher et al. | 455/561 |
| 2002/0098836 A1 * | 7/2002 | Han et al. | 455/423 |
| 2003/0048770 A1 | 3/2003 | Proctor, Jr. | |
| 2003/0119558 A1 * | 6/2003 | Steadman et al. | 455/562 |
| 2004/0002357 A1 | 1/2004 | Benveniste | |
| 2004/0014467 A1 * | 1/2004 | O'Neill et al. | 455/422.1 |
| 2004/0166881 A1 | 8/2004 | Farchmin | |
| 2004/0204114 A1 | 10/2004 | Brennan | |
| 2004/0218582 A1 * | 11/2004 | Kennedy et al. | 370/351 |
| 2004/0224637 A1 | 11/2004 | Silva | |
| 2005/0014464 A1 * | 1/2005 | Larsson | 455/11.1 |
| 2005/0164664 A1 * | 7/2005 | DiFonzo et al. | 455/277.1 |
| 2005/0181723 A1 | 8/2005 | Miller | |

FOREIGN PATENT DOCUMENTS

WO   WO/02087096   10/2002

OTHER PUBLICATIONS

"The 5-Up Protocol gor Unified Multiservice Wireless Networks" Bill McFarland, Greg Chesseon, Carl Chesseon, Carl Temme, and Teresa Meng, Atheros Communications, Inc. Wireless Local Area and Home Networks, 2001 IEEE, Nov. 2001, pp. 74-80.

"Adaptive QoS for Wireless Multimedia Networks Using Power Control and Smart Antennas" Alejandro Mercado and K.J. Ray Liu, IEEE 2002, vol. 51, No. 5, Sep. 2002, pp. 1223-1233.

* cited by examiner

USING DIRECTIONAL ANTENNAS TO ENHANCE WIRELESS MESH NETWORKS

BACKGROUND OF THE INVENTION

1. The Field of the Invention

The present invention relates to wireless networks, and more specifically, to using directional antennas to enhance wireless mesh networks.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

For example, a number of computer systems can be coupled to a data hub through corresponding wired connections (e.g., category 5 cable) to form a wired network (e.g., an Ethernet segment). Similarly, a number of wireless computer systems (commonly referred to as "stations") can be coupled to a wireless access point ("AP") through corresponding wireless connections (e.g., resulting from appropriate communication between radios) to form a wireless network (e.g., an IEEE 802.11 network). Further, a data hub and/or an AP can be connected to other data hubs, APs, or other network components, such as routers, gateways, and switches to form more complex networks (including both wired and wireless connections).

In some networks, interconnections between computer systems result in a mesh topology, where each computer system is redundantly connected to a number of other computer systems. Mesh networks provide increased connectivity and throughput since network traffic can be routed around congestion or failed computer systems (or other nodes). Full mesh networks (i.e., networks where each computer system is directly connected to every other computer system) provide the greatest level of redundancy. However in a wired network environment, full mesh networks are very expensive to implement at least in part due to cabling costs.

More recently, wireless devices have been connected to form wireless mesh networks. Wireless devices are particularly well suited for mesh network implementations since wireless devices are not constrained by cables. Thus, a joining wireless device within communication range of other wireless devices can join an existing mesh network without having to add any physical components (e.g., additional cables) at the other wireless devices. Accordingly, a wireless mesh network can be established in an ad hoc manner between a number of wireless devices that are within communication range of one another.

Wireless devices typically include an omni-directional antenna that facilitates communication with other wireless devices. The omni-directional antenna is used to both transmit data to other wireless devices and receive data from other wireless devices. When no physical barriers exist (e.g., walls, floors, buildings, etc.), the range of the omni-directional antenna essentially results in a spherical region around a corresponding wireless device. Thus, for two wireless devices to meaningfully communicate, the spheres resulting from each wireless device's omni-directional antenna must at least partially overlap. That is, within the particular range, radio signals transmitted from one of the wireless devices will have sufficient signal strength such that, when received, the radio signals are meaningful to the other wireless device.

However, due to the distance and physical barriers separating wireless devices as well as channel interference, wireless communication is often difficult, and at times impossible. For example, when one wireless device is at or near the range of an omni-directional antenna at another wireless device and/or is separated from the omni-directional antenna by physical barriers, radio signal propagation loss (e.g., in the 2.4 GHz band or 5 GHz band) can potentially reduce the speed and reliability of data transferred between the two wireless devices. It may also be that other interfering devices, such as, for example, cordless telephones and microwave ovens, emit signals into a frequency band used for wireless communication. Signals emitted from interfering devices can degrade communication between wireless devices.

When wireless devices are outside the range of one another's omni-directional antennas, when substantial physical barriers separate the wireless devices, and/or when a channel is significantly degraded due to interference, meaningful communication between the wireless devices may not be possible. For example, due to a combination of wall absorption and channel interference, a data rate can be significantly reduced essentially making communication through an omni-directional antenna impossible. Further, while an omni-directional antenna may have sufficient signal strength to detect that radio waves are being received, the signal strength of the received waves may be degraded such that it is difficult, or even impossible, to determine what data is being represented by the radio waves.

As a result of difficulties typical in wireless communication, routing protocols have been developed that allow intermediary wireless devices to route or repeat data such that the data can be transferred from a sending wireless device to a receiving wireless device. For example, a sending wireless device can send data to an intermediary wireless device that in turn forwards the data to a receiving wireless device. Thus, wireless devices that are out of range of corresponding omni-directional antennas or that are separated by physical barriers have an increased chance of being able to exchange data. However, the use of these routing protocols still requires a chain of connectively between wireless devices. If a sending or intermediate wireless device cannot communicate with any other wireless devices that are closer to a receiving wireless device, data may not get forwarded to the receiving wireless device. Therefore systems, methods, and computer program products for using directional antenna to enhance wireless mesh networks would be advantageous.

BRIEF SUMMARY OF THE INVENTION

The foregoing problems with the prior state of the art are overcome by the principles of the present invention, which are directed towards methods, systems, and computer program products for using directional antennas to enhance wireless mesh networks. A number of infrastructure components are included in a wireless mesh network environment. Each infrastructure component includes an omni-directional antenna and one or more directional antennas (e.g., electronically steered phased array antennas) that can be used to communicate with other infrastructure component and wireless devices. Directional antennas can utilize one or more directional beams that can be directed towards an infrastructure component or wireless device to communicate with the infrastructure component or wireless device.

A first infrastructure component uses a first directional antenna beam to communicate (e.g., by sending and/or receiving data) through a second infrastructure device with a destination. A destination can be a destination infrastructure device, a wireless device, or a wired computer system. When sending data from the first infrastructure component, the data can be sent from the first infrastructure component, through the second infrastructure component (and potentially through one or more other infrastructure components), and delivered to the destination. When receiving data at the first infrastructure component, the data is sent from the destination, through the second infrastructure component (and potentially through one or more other infrastructure components), and received at the first infrastructure component.

The first infrastructure component determines that the first infrastructure component can alternatively communicate with the destination through a third infrastructure component. The first infrastructure component may determine that it can communicate with a destination through a third infrastructure component when data is not being appropriately transferred through the second infrastructure component. Data can be prevented from passing through an infrastructure component for any number of reasons, such as, for example, network congestion, failure of communication modules at the infrastructure component, failure of wired links connected to the infrastructure component, or physically barriers that block the antennas of the infrastructure component.

The first infrastructure component uses a second directional antenna beam to communicate through the third infrastructure component with the destination. Accordingly, a first infrastructure component can adapt to communicate through different infrastructure components with a destination. Since directional beams are directed to less area than the area covered by an omni-directional antenna, the signal strength of a directional beam can be greater than that of an omni-directional antenna of the same gain. The greater signal strength of a directed beam may be sufficient to send data to and/or receive data from an infrastructure component or wireless device. Thus, communication is facilitated, possibly at increased data rates, even when communication between omni-directional antennas is not possible (e.g., due to distance, physical barriers, or interference).

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provides for using directional antennas to adaptively communicate in a wireless mesh network. A number of infrastructure components are included in a wireless mesh network environment. Each infrastructure component includes an omni-directional antenna and one or more directional antennas (e.g., electronically steered phased array antennas) that can be used to communicate with other infrastructure component and wireless devices. Directional antennas can utilize one or more directional beams that can be directed towards an infrastructure component or wireless device to communicate with the infrastructure component or wireless device.

Infrastructure components can adapt to communicate with the same destination through different intermediary infrastructure components. Since directional beams are directed to less area than the area covered by an omni-directional antenna, the signal strength of a directional beam can be greater than that of an omni-directional antenna of the same gain. Accordingly, the infrastructure components of a wireless mesh network can be separated by greater distances, potentially reducing the number of infrastructure components (and thus the cost) needed to provide wireless mesh network connectivity.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer system configurations, including hubs, routers, wireless access points ("APs"), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

Figure 1:
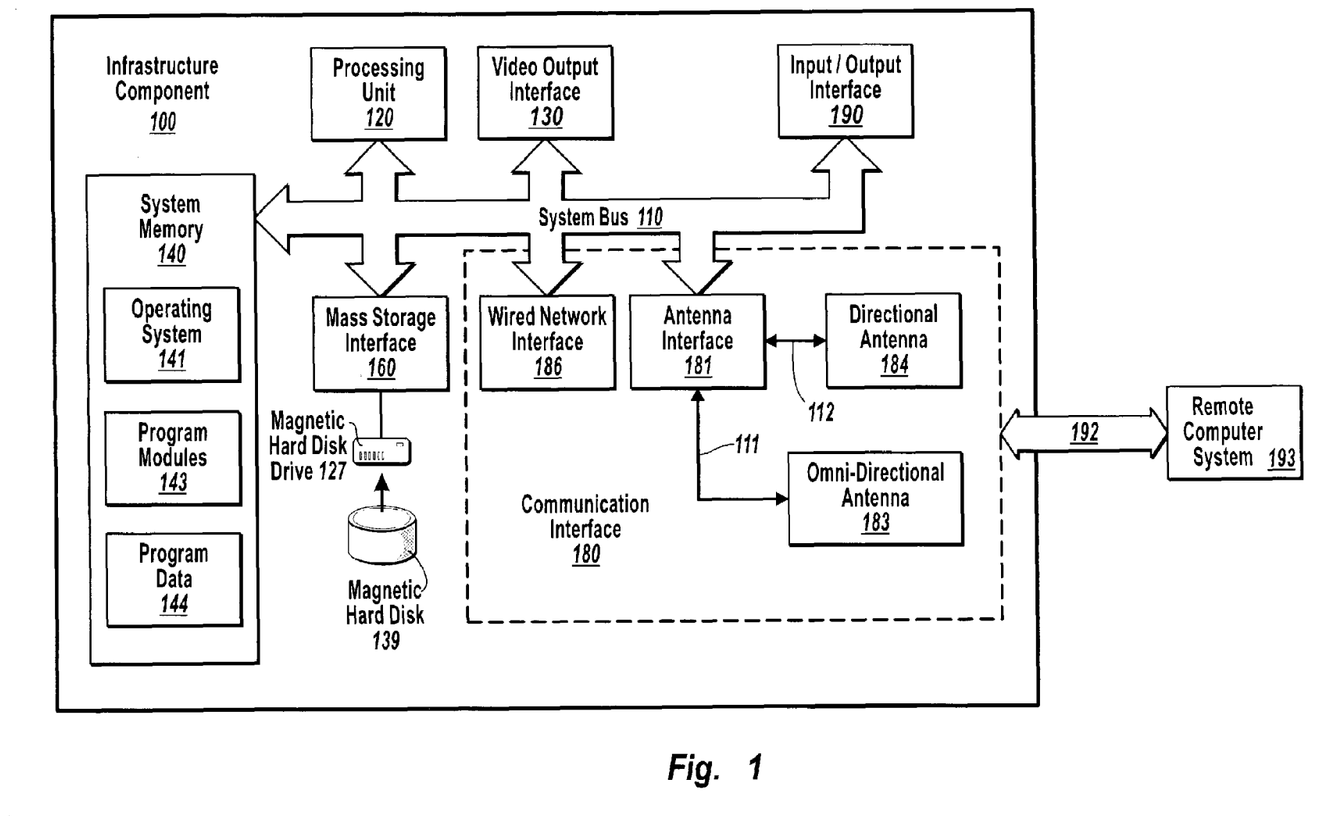
FIG. 1 illustrates a suitable operating environment for the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein. With reference to FIG. 1, a suitable operating environment for the principles of the invention includes a general-purpose computer system in the form of infrastructure component 100.

Infrastructure component 100 includes input/output interface 190 that can receive information from an input device, such as, for example, a keyboard, microphone, or mouse and/or can send information to an output device, such as, for example, antenna diagnostic equipment or a printer. An input device can be coupled to input/output interface 190 so as to enable the entry of information. An input device can transfer information over such a coupling in response to preprogrammed data or user manipulation of the input device. An output device can also be coupled to input/output interface 190 so as to enable the output of information. An output device can receive information over such a coupling in response to preprogrammed data or user manipulation of an input device. Input/output interface 190 can include virtually any type or combination of types of interfaces, such as, for example, a serial port interface, a parallel port interface, an infrared port interface, a Universal Serial Bus ("USB") interface, for sending information to and receiving information from infrastructure component 100.

Infrastructure component 100 includes video output interface 130 that provides a video output signal to external video display devices. Infrastructure component 100 may be integrally positioned with or separate from a video display device, such as, for example, a color or monochrome computer monitor. A video display device can be coupled to video output interface 130 so as to receive a provided video output signal. A video display device can be a mobile video display device that is coupled to video output interface for diagnostic purposes.

Infrastructure component 100 includes processing unit 120, which allows for complex and flexible general-purpose processing capabilities. Processing unit 120 executes computer-executable instructions designed to implement features of infrastructure component 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in infrastructure component 100 is not important to the present invention. Program code means comprising one or more program modules may be stored in system memory 140. The one or more program modules may include an operating system 141, program modules 143, and program data 144.

Infrastructure component 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 interoperate to provide nonvolatile storage of computer-executable instructions, data structures, program modules, and program data for infrastructure component 100. For example, magnetic hard disk 139 can store one or more program modules that include operating system 141, program modules 143, and program data 144.

Infrastructure component 100 is connectable to networks, such as, for example, an office-wide or enterprise-wide computer network, an intranet, and/or the Internet. Infrastructure component 100 can exchange data with external sources, such as, for example, remote computer systems, wireless devices, and other infrastructure components over such a network.

Infrastructure component 100 includes communication interface 180, through which infrastructure component 100 sends data to and/or receives data from external sources. As depicted in FIG. 1, communication interface 180 facilitates the exchange of data with remote computer system 193 via link 192. Link 192 represents a portion of a network, and remote computer system 193 represents a node of the network. For example, remote computer system 193 may be a personal computer or another infrastructure component that is to communicate with infrastructure component 100.

Communication interface 180 includes wired network interface 186. When a link to another computer system is a wired link, infrastructure component 100 can utilize wired network interface 186 to communicate with the other computer system. For example, when link 192 is a wired link, infrastructure component 100 can utilize wired network interface 186 to communicate with remote computer system 193. Wired network interface 186 can include appropriate hardware and software modules, such as, for example, a network interface card and corresponding protocol stack, to facilitate communication over wired links. Modules in wired network interface 186 can interoperate to convert received electrical impulses into a bit stream for use by infrastructure component 100 and to convert bit streams from infrastructure component 100 into electrical impulses for transfer over a wired network.

Communications interface 180 also includes antenna interface 181. When a link to another computer system is a wireless link, infrastructure component 100 can utilize antenna interface 181 to communicate with the other computer system. For example, when link 192 is a wireless link, infrastructure component 100 can utilize antenna interface 181 to communicate with remote computer system 193. Antenna interface 181 can include appropriate hardware and software modules to facilitate communication over wireless links. Modules in antenna interface 181 can interoperate to convert received radio signals into a bit stream for use by infrastructure component 100 and to convert bit streams from infrastructure component 100 into radio signals for transfer over a wireless network.

Infrastructure component 100 includes directional antenna 184 and omni-directional antenna 183 that can each be used to send and receive radio signals. Omni-directional antenna 203 can have a specified omni-directional range based on the power of omni-directional antenna 183. Within the omni-directional range, omni-directional antenna 183 may have sufficient signal strength to send data to and/or receive data from other infrastructure components and wireless devices. On the other hand, outside of the omni-directional range, when physical barriers block omni-directional antenna 183, or when other devices interfere with omni-directional antenna 183, omni-directional antenna 183 may not have sufficient signal strength to send data to and/or receive data from other infrastructure components and wireless devices.

Directional antenna 184 (e.g., an electronically steered phased array antenna) can include one or more feeds for directing directional beams at wireless devices or at other infrastructure components. Directional beams can be directed at wireless devices or at other infrastructure components that are to send data to and/or receive data from infrastructure component 100. For example, when infrastructure component 100 is to send data to remote computer system 193, a directional beam from directional antenna 184 can be directed at remote computer system 193 (e.g., resulting in link 192). Likewise, when infrastructure component 100 is to receive data from remote computer system 193, a directional beam from directional antenna 184 can be directed at remote computer system 193 (e.g., resulting in link 192). Although infrastructure component 100 is depicted as including a single directional antenna (directional antenna 184), infrastructure components can be configured to include a plurality of directional antennas.

Omni-directional antenna 183 and directional antenna 184 are each connected to antenna interface 181 by corresponding links 111 and 112 respectively. Links 111 and 112 can be part of a system bus (e.g., bus 110) or Local Area Network ("LAN") connection. Antenna interface 181 can send data to and receive data from omni-directional antenna 183 and directional antenna 184 over the corresponding links 111 and 112. Antenna interface can also send antenna control commands to omni-directional antenna 183 and directional antenna 184 over the corresponding links 111 and 112. Antenna control commands can cause the configuration of omni-directional antenna 183 and/or directional antenna 184 to change. Accordingly, antenna interface 181 can interoperate with omni-directional antenna 183 and directional antenna 184 to implement the principles of the present invention.

For example, antenna interface 181 can send antenna control commands that cause omni-directional antenna 183 and/or directional antenna 184 to send data to or receive data from a wireless device or infrastructure component. When antenna interface 181 detects that data is not being transferred through an infrastructure component to a destination, antenna interface can send antenna control commands to omni-directional antenna 183 and/or directional antenna 184 to cause infrastructure component 100 to adapt and communicate with a different infrastructure component. For example, antenna interface 181 can send an antenna control command to directional antenna 184 to cause directional antenna 184 to direct a directional beam towards a different infrastructure component. Infrastructure component 100 may then communicate (to send and/or receive data) through the different infrastructure component with the destination.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Modules of the present invention, as well as associated data can be stored and accessed from any of the computer-readable media associated with infrastructure component 100. For example, portions of such modules and portions of associated program data may be included in operating system 141, program modules 143, and/or program data 144, for storage in system memory 140. When a mass storage device, such as, for example, magnetic hard disk 139, is coupled to infrastructure component 100, such modules and associated program data may also be stored at the mass storage device. In a networked environment, program modules depicted relative to infrastructure component 100, or portions thereof, can be stored in remote memory storage devices, such as, for example, system memory and/or mass storage devices associated with remote computer system 193. Execution of such modules may be performed in a distributed environment as previously described.

Figure 2:
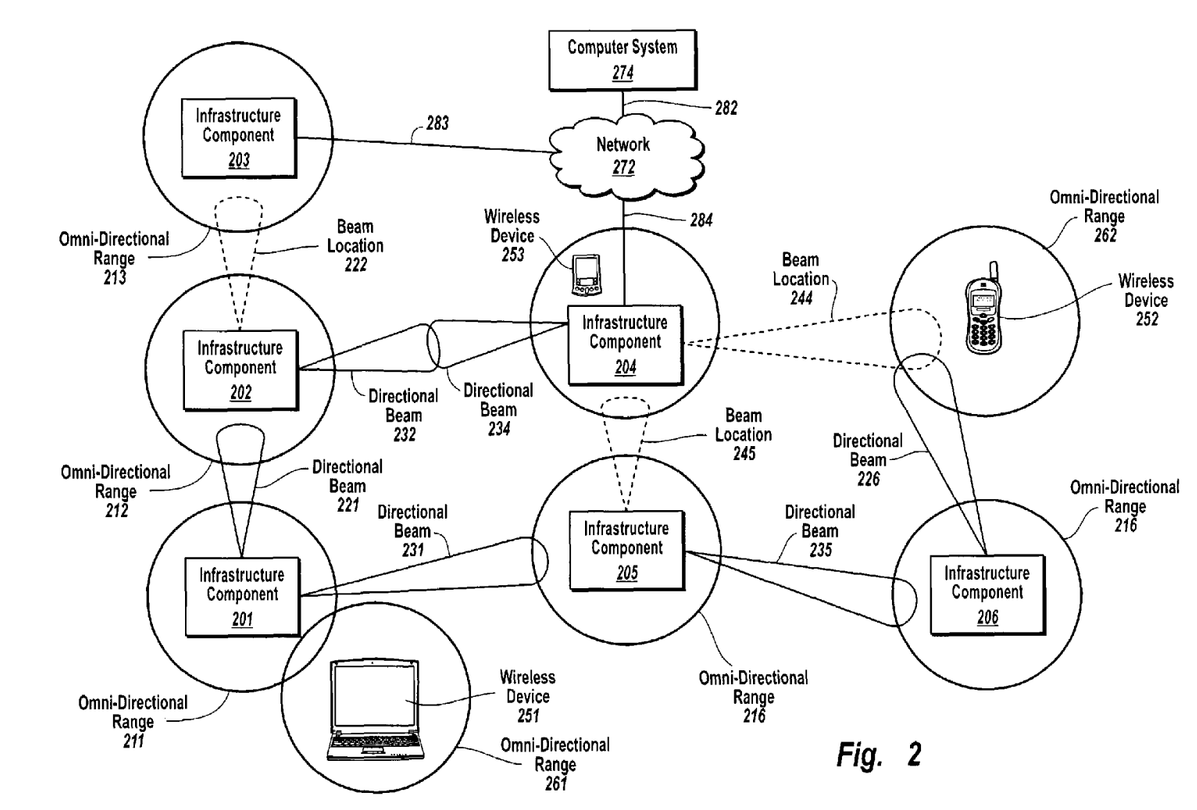
FIG. 2 illustrates an example network architecture that facilitates adaptive communication in a wireless mesh network in accordance with the principles of the present invention.

FIG. 2 illustrates an example network architecture 200 that facilitates adaptive communication in a wireless mesh network. Depicted in network architecture 200 are infrastructure components 201-206, which may be similar in configuration to infrastructure component 100. Infrastructure components 201-206 each include a corresponding omni-directional antenna that can be used to communicate with other infrastructure components or wireless devices. Infrastructure components 201-206 can communicate with other infrastructure components or wireless devices that have an antenna range that at least extends into corresponding omni-directional ranges 211-216 respectively. For example, since wireless device 253 is within omni-directional range 214, infrastructure component 204 can potentially communicate with wireless device 253 using a corresponding omni-directional antenna. Similarly, since omni-directional range 211 overlaps with omni-directional range 261, infrastructure component 201 can potentially communicate with wireless device 251 using a corresponding omni-directional antenna.

Infrastructure components 201-206 each include one or more corresponding directional antennas that can be used to communicate with other infrastructure components or wireless devices. Infrastructure components 201-206 can communicate with other infrastructure components or wireless devices that have an antenna range that at least extends into a corresponding directional beam from a directional antenna. For example, since directional beam 231 overlaps with omni-directional range 216, infrastructure component 201 can communicate with infrastructure component 205 using a corresponding directional antenna. Similarly, since directional beam 226 overlaps with omni-directional range 262, infrastructure component 206 can communicate with wireless device 252 using a corresponding directional antenna. Further, since directional beam 232 overlaps with directional beam 234, infrastructure component 202 and infrastructure component 204 can communicate using corresponding directional antennas.

Infrastructure components 203 and 204 are connected to network 272 via corresponding links 283 and 284 respectively. Links 283 and 284 can be wired links that provide access to resources of network 272 (e.g., Web pages, files, etc.). Computer system 274 is also connected to network 272 via link 282. Network 272 may provide a connection for the transfer of electronic messages (e.g., electronic mail messages, instant messages, etc.) to other computer systems, such as, for example, computer system 274. Network 272 can be a Local Area Network ("LAN"), Wide Area Network ("WAN"), or even the Internet.

Figure 3:
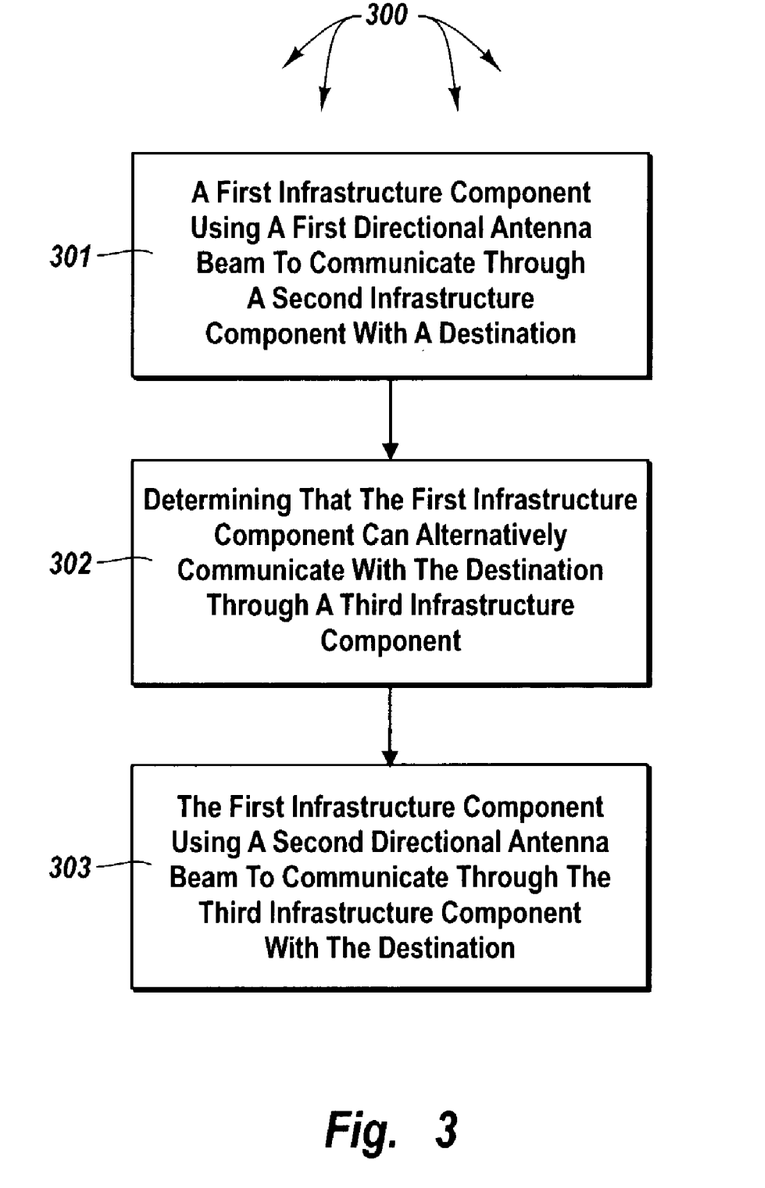
FIG. 3 illustrates an example flowchart of a method for adaptive communication in a wireless mesh network in accordance with the principles of the present invention.

FIG. 3 illustrates an example flowchart of a method 300 for adaptive communication in a wireless mesh network in accordance with the principles of the present invention. The method 300 will be discussed with respect to the infrastructure components, wireless devices, network, and computer system depicted in network architecture 200. The method 300 includes an act of a first infrastructure component using a first directional antenna beam to communicate through a second infrastructure component with a destination (act 301). Act 301 can include a first of a plurality of infrastructure components using a first directional antenna beam to communicate through a second infrastructure component of the plurality of infrastructure components with a destination. Communication can include sending data to and/or receiving data from the destination.

It may be that a destination is another infrastructure component. For example, infrastructure component 201 can use directional beam 221 to communicate through infrastructure component 202 with infrastructure component 204. It may also be that a destination is a wireless device. For example, infrastructure component 205 can use directional beam 235 to communicate through infrastructure component 206 with wireless device 252. It may also be that a destination is a wired computer system or network. For example, infrastructure component 202 can use directional beam 232 to communicate through infrastructure component 204 with network 272 and computer system 274.

The method 300 includes an act of a determining that the first infrastructure component can alternatively communicate with the destination through a third infrastructure component (act 302). Act 302 can include determining that the first infrastructure component can alternatively communicate with the destination through a third infrastructure component of the plurality of infrastructure components. For example, infrastructure component 201 may determine that infrastructure component 201 can communicate with infrastructure component 204 through infrastructure component 205 (as opposed to communicating through infrastructure component 202). Similarly, infrastructure component 205 may determine that infrastructure component 205 can communicate with wireless device 252 through infrastructure component 204 (as opposed to communicating through infrastructure component 206). Likewise, infrastructure component 202 may determine that infrastructure component 202 can communicate with network 272 and/or computer system 274 through infrastructure component 203 (as opposed to communicating through infrastructure component 204).

A first infrastructure component may determine that it can communicate with a destination through a third infrastructure component when data is not being transferred through the second infrastructure component. For example, infrastructure component 201 may determine that infrastructure component 201 can communicate with infrastructure component 204 through infrastructure component 205 when data is not being transferred through infrastructure component 202. Data can be prevented from passing through an infrastructure component for any number of reasons, such as, for example, network congestion, failure of communication modules at the infrastructure component, failure of wired links connected to the infrastructure component, or physical barriers that block the antennas of the infrastructure component. Accordingly, a first infrastructure component can adapt to communicate through different infrastructure components with a destination.

A first infrastructure component may determine that it can communicate with a third infrastructure component when the first infrastructure component determines that an antenna at the first infrastructure component is within range of an antenna at the third infrastructure component. It may be that the first infrastructure component determines that a directional antenna at the first infrastructure component is within a range of an omni-directional antenna at the third infrastructure component. For example, infrastructure component 202 may determine that if a directional beam were directed to beam location 222, the directional beam would be within omni-directional range 213. It may also be that the first infrastructure component determines that a directional antenna at the first infrastructure component is within a range of a directional antenna at the third infrastructure component. For example, infrastructure component 204 may determine that if a directional beam were directed to beam location 244, the directional beam would overlap with directional beam 226.

The method 300 includes an act of the first infrastructure component using a second directional antenna beam to communicate through the third infrastructure component with the destination (act 303). For example, infrastructure component 201 may use directional beam 231 (instead of directional beam 221) to communicate through infrastructure component 205 with infrastructure component 204. Thus, a data path from infrastructure component 201 to infrastructure component 204 is adapted from going through infrastructure component 202 to going through infrastructure component 205. Infrastructure component 205 may direct a directional beam to beam location 245 to facilitate the communication between infrastructure component 201 and infrastructure component 204.

Similarly, infrastructure component 205 may direct a directional antenna beam to beam location 245 (instead of using directional beam 235) to communicate through infrastructure component 204 with wireless device 252. Thus, a data path from infrastructure component 205 to wireless device 252 is adapted from going through infrastructure component 206 to going through infrastructure component 204. Infrastructure component 204 may direct a directional beam to beam location 244 to facilitate the communication between infrastructure component 205 and wireless device 252.

Likewise, infrastructure component 202 may direct a directional beam to beam location 222 (instead of using directional beam 232) to communicate through infrastructure component 203 with network 272 and/or computer system 274. Thus, a data path from infrastructure component 202 to network 272 is adapted from going through infrastructure component 204 to going through infrastructure component 203. Infrastructure component 203 can appropriately route data to facilitate the communication between infrastructure component 202 and network 272 and/or computer system 274.

It should be understood that a first directional beam may or may not originate from the same directional antenna as a second directional beam. It may be that an infrastructure component has a single directional antenna with a single directional beam. Thus, when the infrastructure device is to communicate with another infrastructure component or wireless device, the single directional beam is redirected from a previous direction towards the other infrastructure component or wireless device. For example, to communicate with infrastructure component 203, infrastructure component 202 may re-direct directional beam 232 to beam location 222.

It may also be that an infrastructure component has a single directional antenna with a plurality of directional beams or has a plurality of directional antennas each with one or more directional beams. Thus, when the infrastructure device is to communicate with another infrastructure component or wireless device, one of the beams is directed (or re-directed) towards the other infrastructure component or wireless device, while one or more other beams remain in their current direction. For example, infrastructure component 201 can re-direct directional beam 221 to communicate with a different infrastructure component or wireless device, while directional beam 231 remains directed towards infrastructure component 205.

Since directional beams are directed to less area than the area covered by an omni-directional antenna, the signal strength of a directional beam can be greater than that of an omni-directional antenna of the same gain. The greater signal strength of a directed beam may be sufficient to send data to and/or receive data from an infrastructure component or wireless device, possibly at increased data rates, even when communication between omni-directional antennas is not possible (e.g., due to distance, physical barriers, or interference between a first infrastructure component and a second infrastructure component or wireless device). Thus, a directional beam may have sufficient signal strength to communicate with infrastructure components or wireless devices outside of a corresponding omni-directional range. Accordingly, the infrastructure components of a wireless mesh network can be separated by greater distances, potentially reducing the number of infrastructure components (and thus the cost) needed to provide wireless mesh network connectivity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a wireless mesh network environment that includes a plurality of infrastructure components, a method for the plurality of infrastructure components adaptively communicating with each other, the method comprising:
    an act of a first infrastructure component receiving a first portion of data that is to be transferred to a destination portable device, the first portion of data being one a plurality of portions of data of an electronic message that is to be transferred to a destination portable device;
    an act of the first infrastructure component, which includes an omni-directional antenna and one or more directional antennas, using a first directional antenna beam to transfer the first portion of data through a geographically remote second infrastructure component to the destination portable device, the second infrastructure component being one of a subset of the plurality of infrastructure components forming an available ad hoc data path to the destination portable device at the time the first infrastructure component transferred the first portion of data;
    an act of the first infrastructure component receiving a second portion of data that is to be transferred to the destination portable device, the second portion of data being another of the plurality of portions of data of the electronic message that is to be transferred to the destination portable device;
    an act of the first infrastructure component determining that data passed from the first infrastructure component and through the second infrastructure component is not being appropriately transferred to the destination portable device subsequent to receiving the second portion of data and prior to sending the second portion of data;
    an act of the first infrastructure component determining that the first infrastructure component can alternatively communicate with the destination portable device through a third infrastructure component of the plurality of infrastructure components, in response to the first infrastructure component determining that communication passed from the first infrastructure component and through the second infrastructure component to the destination portable device is not being appropriately transferred, the third infrastructure component being one of a subset of the plurality of infrastructure components forming a second different available ad hoc data path to the destination portable device at the time the first infrastructure component transfers the second portion of data;
    an act of the first infrastructure component adapting to use a second directional antenna beam to send the second portion of data to the third infrastructure component for transfer along the second different available ad hoc data path to the destination portable device.

2. The method as recited in claim 1, wherein the act of the first infrastructure component transferring the first portion of data through a second infrastructure component with a destination comprises an act of the first infrastructure component sending data to the destination.

3. The method as recited in claim 1, wherein the act of the first infrastructure component transferring the first portion of data through a second infrastructure component with a destination comprises an act of the first infrastructure component receiving data from the destination.

4. The method as recited in claim 1, wherein the act of the first infrastructure component transferring the first portion of data through a second infrastructure component with a destination comprises an act of the first infrastructure component directing the first directional antenna beam towards the second infrastructure component.

5. The method as recited in claim 4, wherein the act of directing the first directional antenna beam at the second infrastructure component comprises an act of re-directing the first directional beam from a previous direction towards the second infrastructure component.

6. The method as recited in claim 1, wherein the act of determining that the first infrastructure component can alternatively communicate with the destination portable device through a third infrastructure component comprises an act of the first infrastructure component detecting that data is not being passed through the second infrastructure component to the destination portable device.

7. The method as recited in claim 1, wherein the act of determining that the first infrastructure component can alternatively communicate with the destination portable device through a third infrastructure component comprises an act of the first infrastructure component determining that an antenna at the first infrastructure component is within a range of an antenna at the third infrastructure component.

8. The method as recited in claim 7, wherein the act of determining that an antenna at the first infrastructure component is within a range of an antenna at the third infrastructure component comprises an act of the first infrastructure component determining that a directional antenna at the first infrastructure component is within a range of an omni-directional antenna at the third infrastructure component.

9. The method as recited in claim 7, wherein the act of determining that an antenna at the first infrastructure component is within a range of an antenna at the third infrastructure component comprises an act of the first infrastructure component determining that a directional antenna at the first infrastructure component is within a range of a directional antenna at the third infrastructure component.

10. The method as recited in claim 1, wherein the act of the first infrastructure component adapting to use a second directional antenna beam to send the second portion of data to the third infrastructure component comprises an act of first infrastructure component sending data to the third infrastructure component that would have otherwise been sent to the second infrastructure component.

11. The method as recited in claim 1, wherein the act of the first infrastructure component adapting to use a second directional antenna beam to send the second portion of data the third infrastructure component comprises an act of first infrastructure component receiving data from the third infrastructure component that would have otherwise been received from the second infrastructure component.

12. The method as recited in claim 1, wherein the act of the first infrastructure component adapting to use a second directional antenna beam to send the second portion of data the third infrastructure component comprises an act of the first infrastructure component sending data to the destination.

13. The method as recited in claim 1, wherein the act of the first infrastructure component adapting to use a second directional antenna beam to send the second portion of data the third infrastructure component comprises an act of the first infrastructure component receiving data from the destination.

14. The method as recited in claim 1, wherein the act of the first infrastructure component adapting to use a second directional antenna beam to send the second portion of data the third infrastructure component comprises an act of the first infrastructure component communicating through the third infrastructure component with a destination infrastructure component.

15. The method as recited in claim 1, wherein the act of the first infrastructure component adapting to use a second directional antenna beam to send the second portion of data the third infrastructure component comprises an act of the first infrastructure component communicating through the third infrastructure component with a wireless device.

16. The method as recited in claim 1, wherein the act of the first infrastructure component adapting to use a second directional antenna beam to send the second portion of data the third infrastructure component comprises an act of the first infrastructure component communicating through third infrastructure component with a wired computer system.

17. The method as recited in claim 1, wherein the act of the first infrastructure component adapting to use a second directional antenna beam to send the second portion of data the third infrastructure component comprises an act of directing the second directional antenna beam towards the third infrastructure component.

18. The method as recited in claim 17, wherein the act of directing the second directional antenna beam at the third infrastructure component comprises an act of re-directing the second directional antenna beam from a previous direction towards the third infrastructure component.

19. The method as recited in claim 1, wherein the first directional antenna beam and the second directional antenna beam are the same directional antenna beam.

20. The method as recited in claim 1, wherein the first directional antenna beam and the second directional antenna beam are both directional antenna beams from a directional antenna that has a plurality of feeds for directing directional antenna beams through infrastructures which relay communication to the destination.

21. The method as recited in claim 1, wherein the first directional antenna beam is a directional antenna beam from a first directional antenna and the second directional antenna beam is a directional antenna beam from a second directional antenna.

22. A method as recited in claim 1, wherein each of the second and third infrastructure components also includes both an omni-directional antenna and one or more directional antennas.

23. A method as recited in claim 22, wherein the one or more directional antennas at each of the second and third infrastructure components communicate with the destination.

24. A method as recited in claim 1, wherein at least one of the one or more directional antennas is an electronically steered phased array antenna.

25. A method as recited in claim 1, wherein the act of the first infrastructure component determining that data passed from the first infrastructure component and through the second infrastructure component is not being appropriately transferred to the destination portable device includes an act of determining that data can be transferred to the destination portable device more effectively through the third infrastructure component.

26. A computer program product for use in a wireless mesh network environment that includes a plurality of infrastructure components, the computer program product for implementing a method for the plurality of infrastructure components adaptively communicating with each other, the computer program product comprising one or more physical computer-readable storage media having stored thereon computer executable instructions that, when executed by a processor, cause a first infrastructure component of the plurality of infrastructure components to perform the following:

receive a first portion of data that is to be transferred to a destination portable device, the first portion of data being one a plurality of portions of data of an electronic message that is to be transferred to a destination portable device;

use a first directional antenna beam to transfer the first portion of data through a geographically remote second infrastructure component to a destination portable device, wherein the first infrastructure component includes an omni-directional antenna and one or more directional antennas, the second infrastructure component being one of a subset of the plurality of infrastructure components forming an available ad hoc data path to the destination portable device at the time the first infrastructure component transferred the first portion of data;

receive a second portion of data that is to be transferred to the destination portable device, the second portion of data being another of the plurality of portions of data of the electronic message that is to be transferred to the destination portable device;

determine that data passed from the first infrastructure component and through the second infrastructure component is not being appropriately transferred to the destination portable device subsequent to receiving the second portion of data and prior to sending the second portion of data;

in response to determining that data passed from the first infrastructure component and through the second infrastructure component is not being appropriately transferred to the destination portable device, determine that the first infrastructure component can alternatively communicate with the destination portable device destination through a third infrastructure component of the plurality of infrastructure components, the third infrastructure component being one of a subset of the plurality of infrastructure components forming a second different available ad hoc data path to the destination portable device at the time the first infrastructure component transfers the second portion of data; and     adapt to use a second directional antenna beam to send the second portion of data to the third infrastructure component for transfer along the second different available ad hoc data path to the destination portable device.

27. The computer program product as recited in claim 26, wherein the one or more computer-readable media include system memory.

28. An infrastructure component configured to adaptively communicate with one or more other infrastructure components in a wireless mesh network, the infrastructure component comprising the following:

an omni-directional antenna and one or more directional antennas, each directional antenna having one or more feeds for directing antenna beams at other infrastructure components which relay communication to a portable destination component;

one or more processing units; and one or more computer readable media having stored thereon an antenna interface, the antenna interface being configured to:

receive a first portion of data that is to be transferred to a destination portable device, the first portion of data being one a plurality of portions of data of an electronic message that is to be transferred to a destination portable device;

use a first directional antenna beam to cause the infrastructure component to transfer the first portion of data through a second infrastructure component to the portable destination component, the second infrastructure component being one of a subset of the one or more other infrastructure components forming an ad hoc data path to the portable destination component at the time the infrastructure component transfers the first portion of data;

receive a second portion of data that is to be transferred to the portable destination component, the second portion of data being another of the plurality of portions of data of the electronic message that is to be transferred to the portable destination component;

determine that data passed from the infrastructure component and through the second infrastructure component is not being appropriately transferred to the destination portable device subsequent to receiving the second portion of data and prior to sending the second portion of data;

determine that the first infrastructure component can alternatively communicate with the portable destination component through a third infrastructure component from among the one or more other infrastructure components, in response to the first infrastructure component determining that communication passed from the first infrastructure component and through the second infrastructure component to the portable destination component is not being appropriately transferred, wherein the second infrastructure component is geographically remote from the first infrastructure component, the third infrastructure component being one of a subset of the plurality of infrastructure components forming a second different available ad hoc data path to the destination portable device at the time the first infrastructure component transfers the second portion of data; and     adapt to use a second directional antenna beam to send the second portion of data to the third infrastructure component for transfer along the second different available ad hoc data path to the portable destination component.

* * * * *